June 4, 1968  G. R. WHITTEN, JR  3,386,107
LEVEL CONTROL AND CIRCULATION SYSTEM FOR SWIMMING POOLS
Filed Jan. 5, 1966  4 Sheets-Sheet 2

Inventor:
George R. Whitten, Jr.
by Arthur D. Thomson
Attorney

Inventor:
George R. Whitten, Jr.
by Arthur D. Thomson
Attorney

June 4, 1968   G. R. WHITTEN, JR   3,386,107
LEVEL CONTROL AND CIRCULATION SYSTEM FOR SWIMMING POOLS
Filed Jan. 5, 1966   4 Sheets-Sheet 4
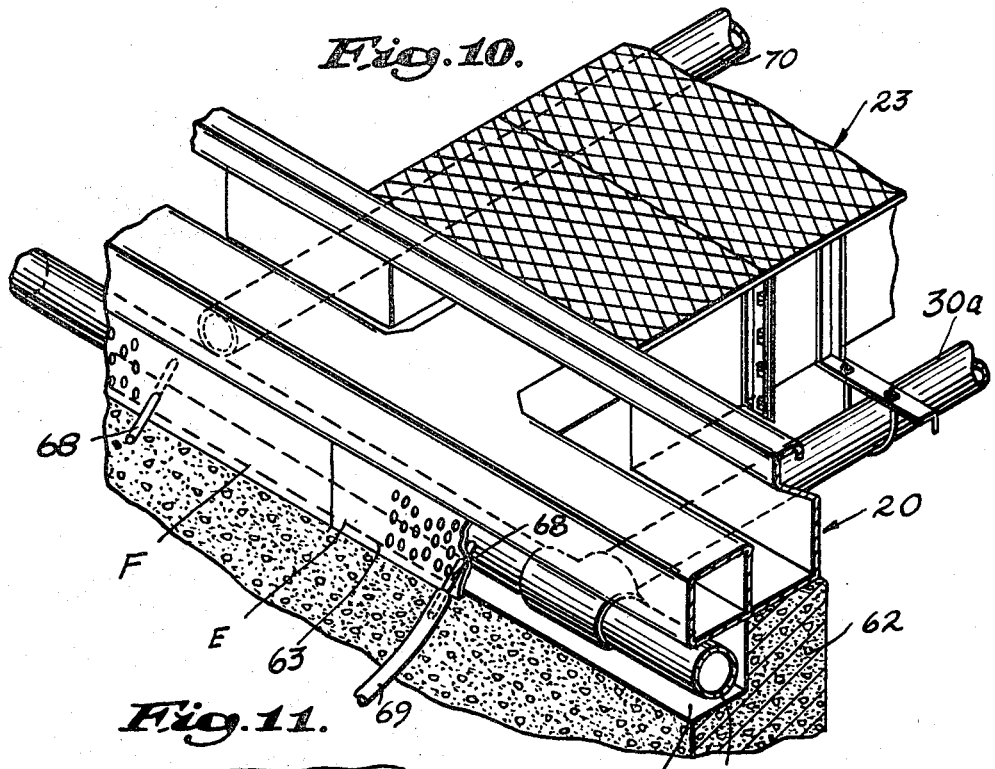
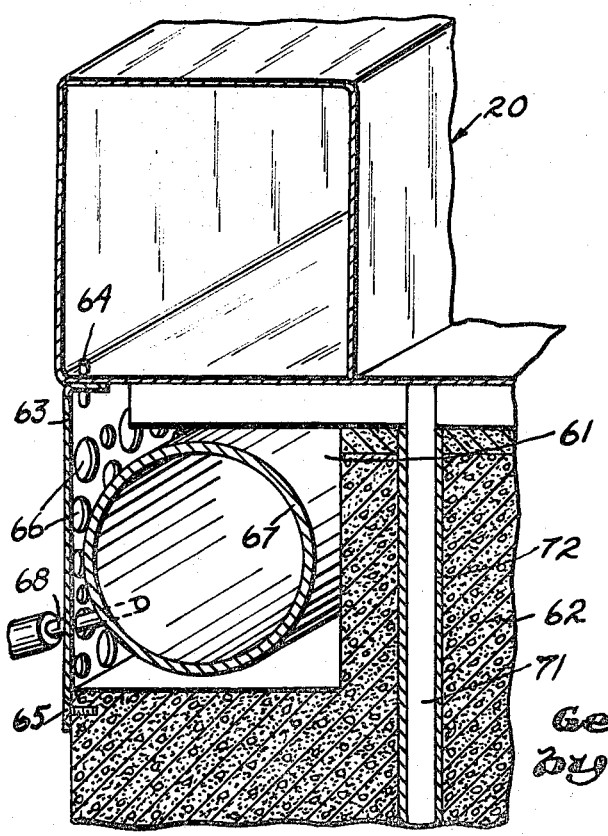
Inventor:
George R. Whitten, Jr.
by Arthur D. Thomson
Attorney United States Patent Office 3,386,107
Patented June 4, 1968

3,386,107
LEVEL CONTROL AND CIRCULATION SYSTEM
FOR SWIMMING POOLS
George R. Whitten, Jr., 400 Center St.,
Bellingham, Mass. 02019
Filed Jan. 5, 1966, Ser. No. 518,861
3 Claims. (Cl. 4—172)

ABSTRACT OF THE DISCLOSURE

A water level control and circulation system for swimming pools. A control tank is connected directly to the interior of the pool by an equalizer tube to keep the water level in the two the same. The level in the tank is maintained by a drain with an opening set at the desired level to remove excess water when the level in the tank rises, and a float valve which controls a make-up water supply and operates when the level falls. The pool has a drainage gutter connected to a manifold draining into a surge tank. A pump circulates water from the surge tank to the pool and back. The water level in the surge tank is kept below that of the pool by a float valve which shuts the return line from the pool to the surge tank when the level in the surge tank rises above a certain point.

---

This invention relates to swimming pools, and particularly to pools of the type having a water recirculating and filtering system.

Most swimming pools of the recirculating type are provided with a gutter around the periphery to collect splash and overflow water. The water is drained from the gutter and returned to a filtering system. It is desirable to maintain a constant flow of water along the gutter to keep it clean. In many such installations, parts of the gutter remote from the drain pipe do not drain rapidly enough to cary off dirt and debris which collects in the gutter. It is also necessary to maintain the water level in the pool at the right height with respect to the gutter to provide the right amount of overflow and washing action. This is usually done by adjusting various intake and outlet valves. In pools which are subject to widely varying conditions of use, the adjustment of the valves can become quite troublesome.

The principal object of this invention is to provide a swimming pool with an improved gutter and drainage system in which all parts of the gutter are effectively washed and drained. Another object is to provide a simple level control system which automatically maintains the water level in the pool at the correct height under various conditions. Still another object is to provide a readily accessible intake system for returning filtered water to the pool and a convenient cleaning system. Other objects, advantages, and novel features will be apparent from the following description.

The pool here described has a gutter assembly consisting of an open topped outer gutter and a closed inner gutter which serves as the inner wall of the outer gutter. The outer gutter is divided into several drainage regions by baffles which direct water through openings in the inner gutter so that selected regions drain into the inner gutter. The gutter drains into a collector manifold which has separate conduits, one for each drainage region. The manifold drains into the empty upper part of a surge tank. The main drain of the pool is also connected to the surge tank through a float valve which controls the level in the tank, and the pump draws water, through a filter, from the surge tank and returns it to the pool.

The water level in the pool is controlled by a level control tank connected directly to the pool by a pipe, referred to as an equalizer tube, which keeps the water in the pool and the control tank at the same level. The control tank has an overflow pipe through which water escapes if the level rises too high. If the level falls below a certain point, a valve controlled by a float mounted in the control tank opens and admits fresh water from a make up water line to the control tank. In its preferred form the pool has a recessed channel in its walls below the gutter assembly. The channel is covered by a vertical grill which is removable, and a return pipe for admitting filtered water to the pool is disposed in the channel. The pipe has discharge tubes projecting through the grill at spaced points around the pool and hoses may be attached to any of the tubes for cleaning the bottom of the pool.

In the drawings illustrating the invention:

FIG. 7 is an enlarged perspective view of a typical joint in the gutter sections;

FIG. 10 is a fragmentary perspective view taken in the region of the manifold showing a modified form of the water inlet system; and FIG. 11 is an enlarged fragmentary perspective view taken in the region of the gutter, showing an alternative form of mounting for the gutter.

Figure 1:
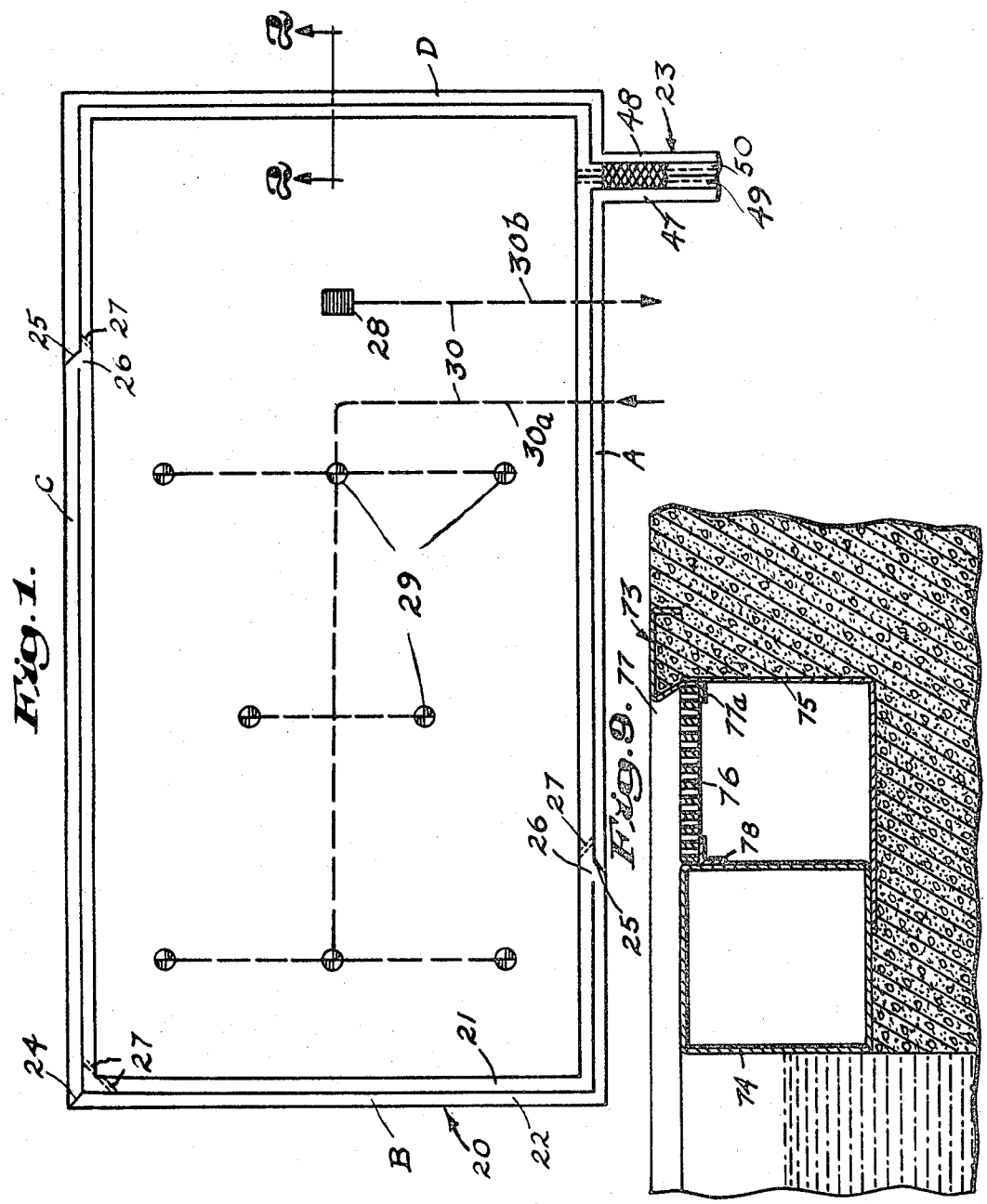
FIG. 1 is a schematic plan view of a swimming pool constructed according to the invention.

The pool, as shown in FIG. 1, is rectangular in shape, and has a gutter assembly, generally indicated by the numeral 20, around its entire perimeter. The gutter assembly consists of a closed inner gutter 21 and an open topped outer gutter 22. Near one corner of the pool, the gutters are connected to a collector manifold, generally indicated by the numeral 23. At the corner farthest from the manifold, a partition 24 extends across the outer gutter. Two baffles 25 also extend across the outer gutter at spaced points next to openings 26 in the wall of the inner gutter. A number of flushing tubes 27 connecting the outer gutter to the interior of the pool are also provided.

The walls and floor of the pool are constructed in any customary manner, for example they may be made of poured concrete. A main drain 28, and a number of adjustable inlets 29 are mounted in the floor of the pool. The drains and inlets are connected by piping below the floor of the pool, as indicated by the dotted lines 30, to a pump and a filter.

Figure 2:
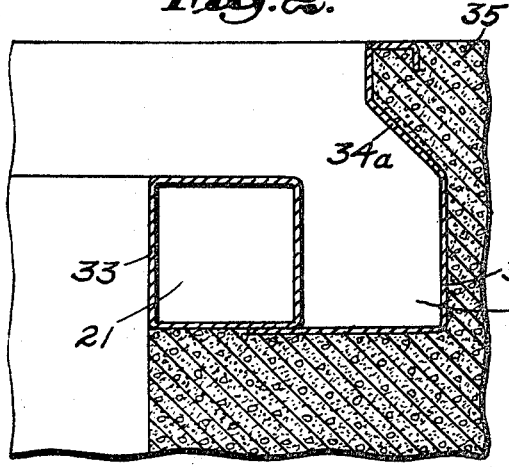
FIG. 2 is an enlarged fragmentary cross-section taken along line 2—2 of FIG. 1.

As shown in FIG. 2, the gutter assembly is made up of sections of formed sheet metal welded together. A box section 33 forms the inner gutter 21, and an angle section 34 forms the outer gutter 22. Section 34 has a lip 34a partly overhanging the outer gutter. The gutter assembly is embedded in a concrete apron 35 surrounding the pool. It is understood that the apron may be poured as a continuation of the side wall of the pool.

The gutter sections are made up in lengths and any number of lengths may be joined together for pools of various sizes. A typical joint and anchor construction is shown in FIG. 7. A U-shaped tie bolt 36 is embedded in the side wall 37 of the pool. An angle bracket 38 is welded to the bottom of sections 33 and 34 is connected to the bolt. An angle brace 39 is welded to the outer side of section 34. An angle 40 is fastened inside lip 34a, and a sleeve 41 is fastened inside section 33. To connect another length of gutter to the one shown, the ends of the box section and lip of the new length are slid over sleeve 41 and angle 40 and fastened in place by welding or bolts. When the entire gutter has been assembled, the concrete apron 35 is poured around the sections as illustrated in FIG. 2.

Figure 3:
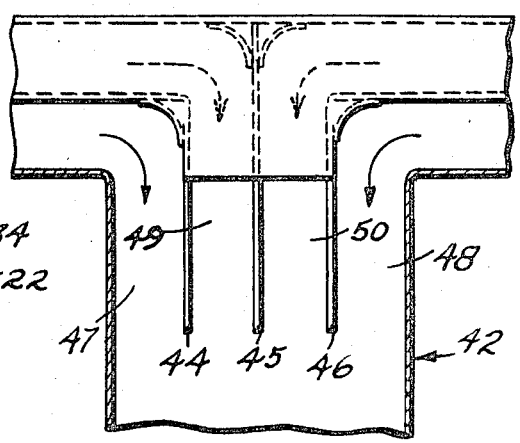
FIG. 3 is an enlarged fragmentary plan view taken in the region of the junction of the gutters and the discharge manifold.
Figure 8:
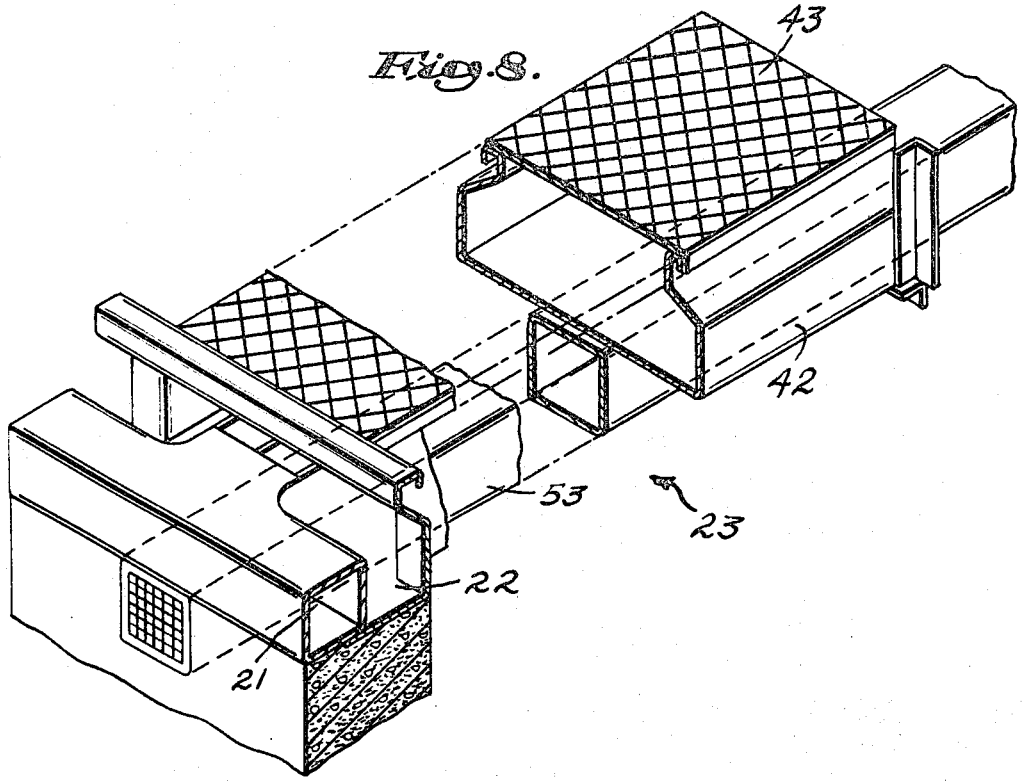
FIG. 8 is a perspective view, partly broken away, of the discharge manifold.

As shown in FIGS. 3 and 8, the manifold 23 is formed as an open topped sheet metal channel 42 covered by a grating 43. At the inner end of the manifold are three partitions 44, 45 and 46, forming with channel 42 two outer drainage conduits 47 and 48, which communicate with the outer gutter, and two inner drainage conduits 49 and 50, which communicate with the inner gutter. This arrangement, with the baffles 25 and partition 24, divides the outer gutter into four separate drainage regions A, B, C and D, from which water overflowing into the outer gutter is drained. Regions A and D drain directly into conduits 47 and 48, and regions B and C drain into conduits 49 and 50 by way of the inner gutter.

The flushing tubes 27 are disposed at the ends of each of the four drainage regions farthest from the manifold. As illustrated in FIG. 1, the flushing tube 26 passes through the inner gutter and connects the outer gutter with the interior of the pool. These tubes are below the normal water level of the pool and provide a continuous flow of water into the four regions of the outer gutter to wash away dirt and debris.

Figure 6:
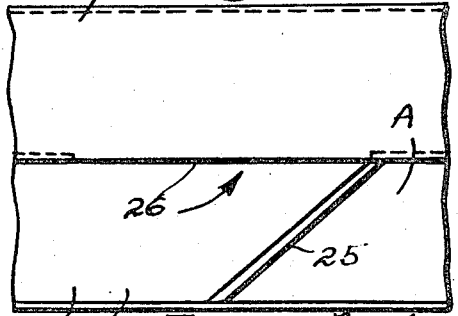
FIG. 6 is an enlarged fragmentary plan view of the gutter assembly in the region of one of the baffles.

The baffle 25 which separates region A from region B of the outer gutter is shown in detail in FIG. 6. The baffle is disposed obliquely across gutter 22 from one side of an opening 26 in the side wall of gutter 21, and deflects water from region B through the opening into the inner gutter. The baffle separating regions C and D is similar.

Figure 4:
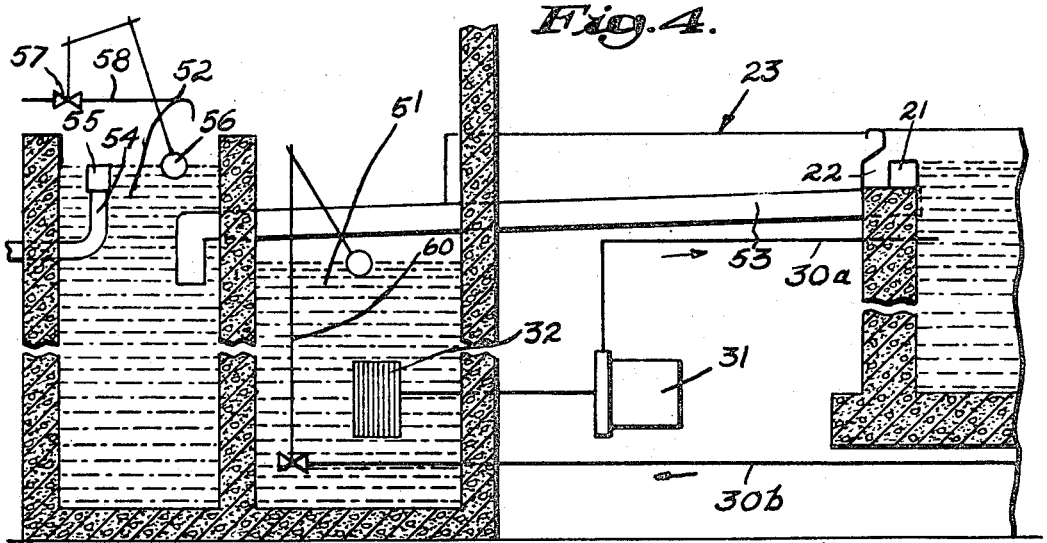
FIG. 4 is a schematic view of the level control system for the pool.
Figure 5:
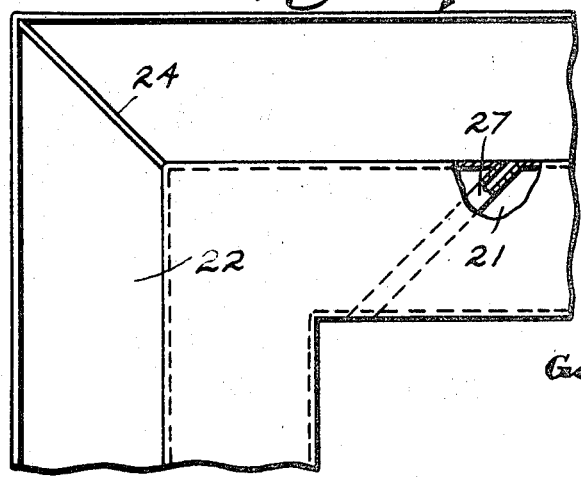
FIG. 5 is an enlarged fragmentary plan view of one of the corners of the gutter assembly.

The level control system for the pool is illustrated in FIG. 4. A surge tank 51 and a level control tank 52 are mounted to one side of the pool 53. The manifold 23 leads from the gutter assembly 20 to the surge tank. The bottom wall of the manifold is pitched downward toward the surge tank. A rectangular duct 53, referred to as the equalizer tube, is mounted below the manifold and connects the interior of the pool with the control tank 52, so that the water level in the pool and in the control tank tends to remain the same. An overflow 54, carrying a sleeve 55, which is adjustable in height, is mounted in tank 52. If the water level rises above the top of sleeve 55, water will run out through the overflow 54. A float 56 is mounted in tank 52 and opens a valve 57 when the water in that tank falls below a certain level. The valve controls a make up water line 58, which is connected to a fresh water supply (not shown) and empties into tank 52. As shown in FIG. 4, a pump 31 discharges into the return line 30a which may be connected to inlets 29 in the bottom of the pool, as shown in FIG. 1, or to the return pipe mounted under the gutter as will be explained later. The pump draws water through a filter 32 from tank 51. The drain line 30b, which is connected to the main drain 28 runs into tank 51 and is controlled by a float valve 60. This float valve is set to maintain the level of water in tank 51 below the bottom of manifold 23 so that the latter drains into an air gap in the upper part of the tank.

The pool is normally filled to the top of the inner gutter 21. The inlets 29 are preferably adjusted so that a continuous overflow into gutter 22 is maintained to produce a skimming action. Water also flows into the outer gutter through the flushing tubes 27. The overflow drains through manifold 23 into tank 51. Water is drawn from tank 51 through filter 32 by the pump and returned to the pool. When the water level in tank 51 is below the operating level of float valve 60, the valve is open and water is drawn from the pool through line 30b into the tank. If the level rises above that for which valve 60 is set the valve closes so that no more water is drawn from the main drain until the pump has removed enough water from tank 51 to restore the proper level.

Sleeve 55 is adjusted so that its top is at the desired water level for the pool. If the water in the pool rises above this point, flow takes place from the pool to tank 52 through tube 53, and the excess water escapes through overflow 54. If the level in the pool falls below the desired level, water flows out of tank 52 through the equalizer tube. When the level in tank 52 drops, valve 57 opens and fresh water is introduced into tank 51 from the make up water line 58. This additional water flows into the pool through the equalizer tube until the desired level in both the pool and the control tank is restored.

In the event of a sudden rise or surge, such as might occur if a number of people entered the pool at once, most of the excess water overflows into the gutter and through manifold 23, into tank 51 and thus is eventually returned to the pool. Flow out through the relatively small equalizer tube takes place at a lower rate, so that a temporary change in level does not cause undue loss of water from the system.

FIGS. 10 and 11 illustrate an alternative filtered water return system in which the floor inlets 29 and associated piping are omitted, and all the piping is readily accessible. Below the gutter assembly is a recessed horizontal channel 61 formed in the concrete side wall 62 of the pool and facing the inside of the pool. A plate 63 covers the opening of the channel and is fastened to the gutter and the wall by removable fasteners 64 and 65. It is understood that the channel may be formed along one or more sides of the pool, or all around the periphery as desired. The plate is preferably made up of butted sections, such as E and F in FIG. 10, of convenient length for handling, and any number of sections may be used, according to the size of the pool. The plate is provided with a number of holes 66.

A feed pipe 67 is disposed in the channel and is connected to the feed line 30a which delivers water from the pump 31. The pipe 67 is provided at spaced points with discharge tubes 68 which extend through adjacent holes 66 in the plate and discharge the filtered water into the pool. A hose 69 may be connected to one or more of the discharge tubes, when desired, to clean the bottom of the pool. The hose carries the usual nozzle (not shown) at its free end, which drops to the bottom of the pool. Discharge of water from the hose cause the nozzle to move about and stirs up sediment which rises and is carried off by the gutter drainage system. The cleaning operation is usually performed at times when the pool is not in use, and the hoses removed when the pool is to be used.

A tube 70, which opens into chanel 61, leads to tank 52 and takes the place of equalizer tube 53 for the purpose previously described.

Figure 9:
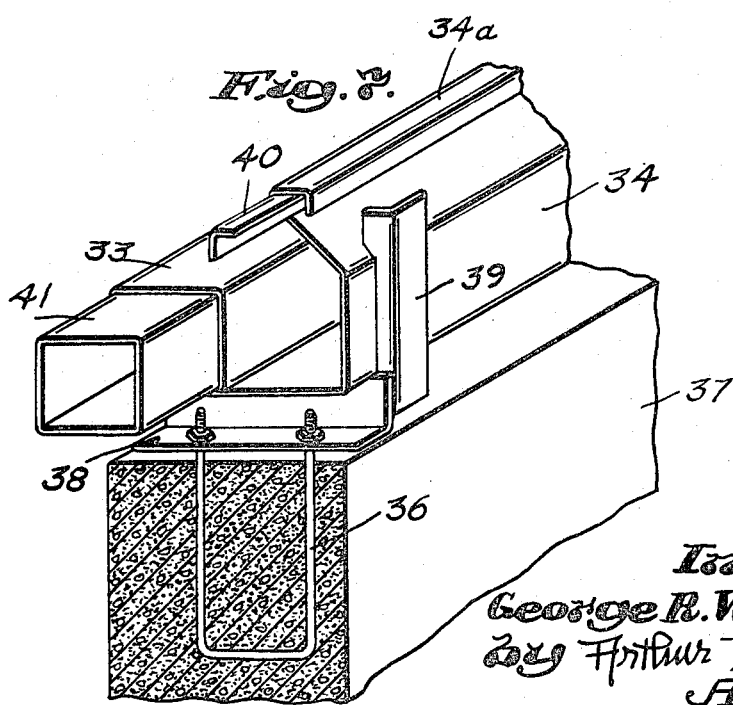
FIG. 9 is a cross-section of a modified form of gutter assembly.

FIG. 9 illustrated a modification of the gutter assembly for ground level or flush installation. The gutter assembly, generally indicated by the numeral 73, is made up of a box section 74 forming the inner gutter 74, and an angle section 75 forming with the outer wall of section 74, the open topped outer gutter. A perforated grating 76 is mounted over the top of the outer gutter. A finish molding 77 is welded to the upper edge of section 75 and has an inwardly projecting flange 77a. An angle 78 is welded to section 74. The grating is supported on the flange and the angle. The baffle and manifold system used with this form of gutter is the same as that previously described and either the floor type or the wall type of return system may be used.

What is claimed is:

1. A swimming pool having drainage and level control system comprising a gutter along the periphery of the pool, a drain manifold connected to said gutter, a surge tank into which said manifold drains, a level control tank, a conduit directly connecting said level control tank to said pool to maintain the same water level in the two, a water supply line discharging into said control tank, and overflow for said control tank disposed at the desired water level for the pool, a valve controlling said water supply line and adapted to open when the water in said control tank falls below said level, and means for maintaining the water level in said surge tank below that establish in the pool by said control tank, so as to insure continuous drainage of water from said gutter to said surge tank.

2. A drainage and level control system as described in claim 1, said conduit being smaller than said manifold.

3. A drainage and level control system as described in claim 1, including a pumping system arranged to draw water from said surge tank and recirculate it to said pool, and a return drain pipe from said pool to said surge tank, said means for maintaining the water level in said surge tank comprising a float valve controlling said return pipe and arranged to close at a water level below that maintained in the pool.

References Cited

UNITED STATES PATENTS

| | | | |
|---|---|---|---|
| 1,670,094 | 5/1928 | Becker | 4—172 |
| 1,714,069 | 5/1929 | Becker | 4—172 |
| 2,739,939 | 3/1956 | Leslie | 4—172 |
| 3,221,268 | 10/1956 | Ortega | 137—429 |
| 3,252,576 | 5/1966 | Miller | 137—429 |

LAVERNE D. GEIGER, *Primary Examiner.*

H. K. ARTIS, *Assistant Examiner.*